United States Patent [19]
Motley et al.

[11] 3,962,637
[45] June 8, 1976

[54] ULTRAFAST ADAPTIVE DIGITAL MODEM

[75] Inventors: David M. Motley, Santa Ana; King Y. Cheng, Tustin, both of Calif.

[73] Assignee: Hycom Incorporated, Irvine, Calif.

[22] Filed: Nov. 11, 1974

[21] Appl. No.: 522,642

[52] U.S. Cl. .................................. 325/42; 333/18
[51] Int. Cl.² ......................................... H03H 7/36
[58] Field of Search ..................... 325/42, 324–326, 325/444, 472, 476, 65; 333/17, 18

[56] References Cited
UNITED STATES PATENTS

| | | | |
|---|---|---|---|
| 3,644,830 | 2/1972 | Ragsdale | 325/42 |
| 3,701,948 | 10/1972 | McAuliffe | 325/42 |
| 3,787,762 | 1/1974 | Sato | 325/324 |

*Primary Examiner*—Benedict V. Safourek
*Attorney, Agent, or Firm*—Gordon L. Peterson

[57] ABSTRACT

A receiver includes means for sampling and noncoherently demodulating a received signal to provide digital symbols in each of a first and second channel. An equalization network equalizes the incoming signal and a phase correction network corrects the phase of the equalized signal. In response to the transmission of a preamble in the first channel, a fast learn network derives the phase error by determining the arc tangent of a quotient formed by dividing the signal in the first channel by the signal in the second channel. A course phase jump can be made to insure that the arc tangent is not greater than unity. The timing error of the sampling means can be derived by determining the arc tangent of a quotient formed by dividing the present digital symbol in the one channel by the preceding digital symbol in the one channel. In response to an impulse in the preamble, the lead-in samples of an impulse response can be stored while the phase error is computed from the major sample; then the phase of the lead-in samples can be corrected. Equalization coefficients can be derived from the phase corrected impulse response samples. With this apparatus, in accordance with the preferred method of the present invention, the receiver can be adapted to receive normal data in less than thirty milliseconds.

21 Claims, 13 Drawing Figures

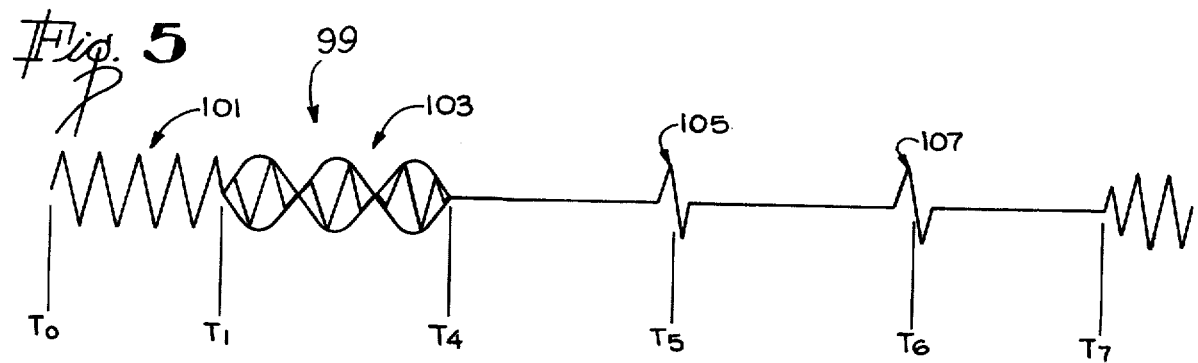
Fig. 5
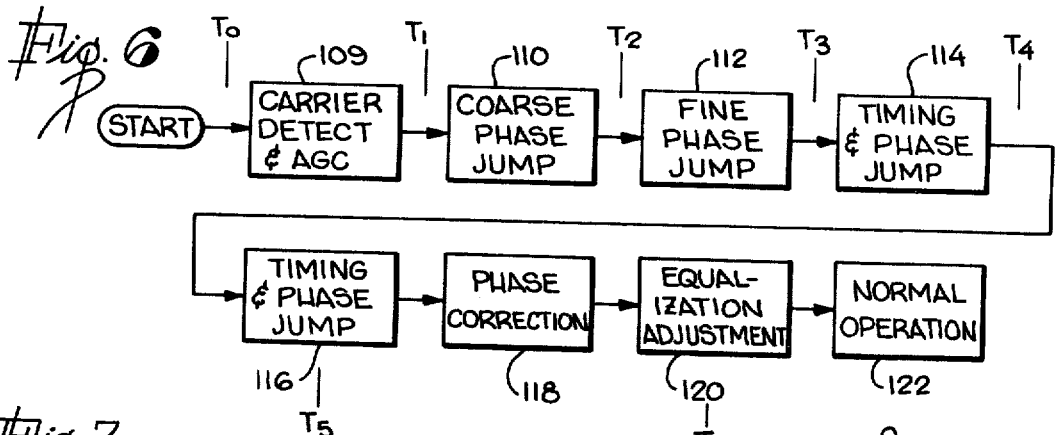
Fig. 6
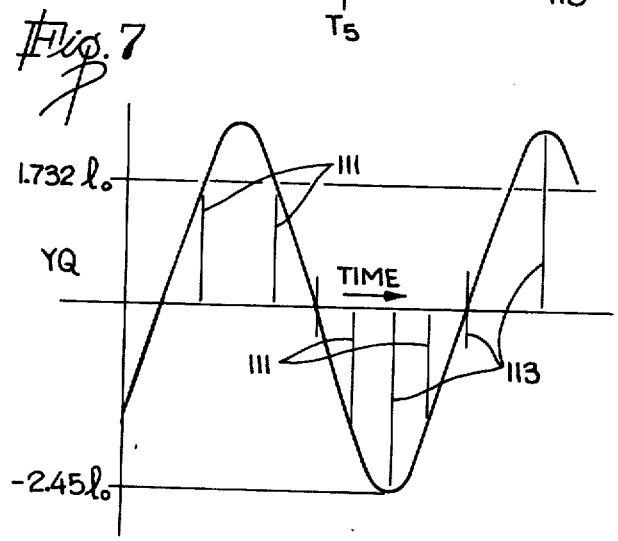
Fig. 7
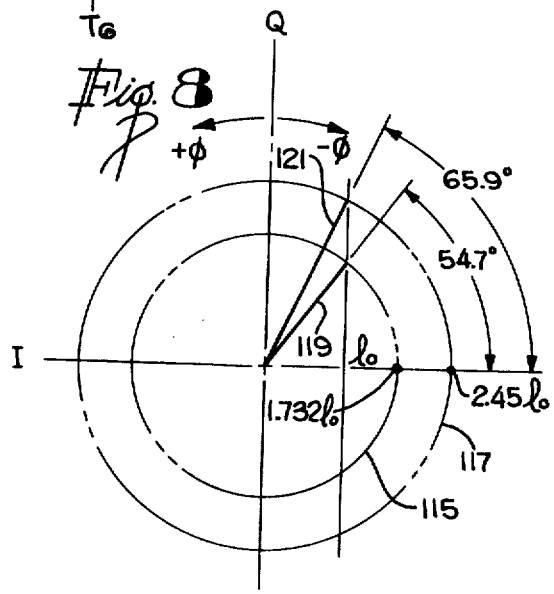
Fig. 8
Fig. 9
| TIMING | PHASE ERROR | | |
|---|---|---|---|
| | YI < $l_o$ (NO JUMP) | YI ≥ $l_o$ (JUMP 60°) | |
| | | YQ = 0 | YI = $l_o$ |
| 0 | 35.3° | 30° | 24.7° |
| .5 | 24.1° | 30° | 35.9° |

Fig. 10
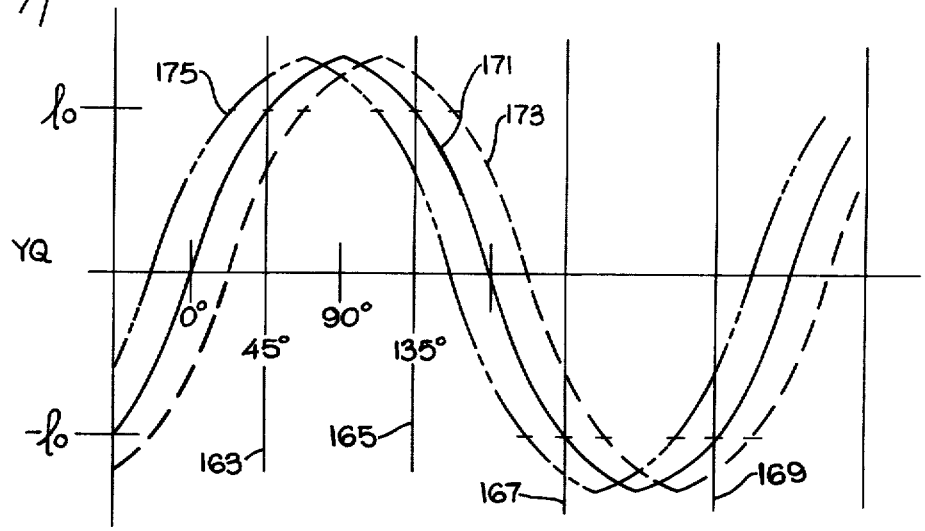
Fig. 11
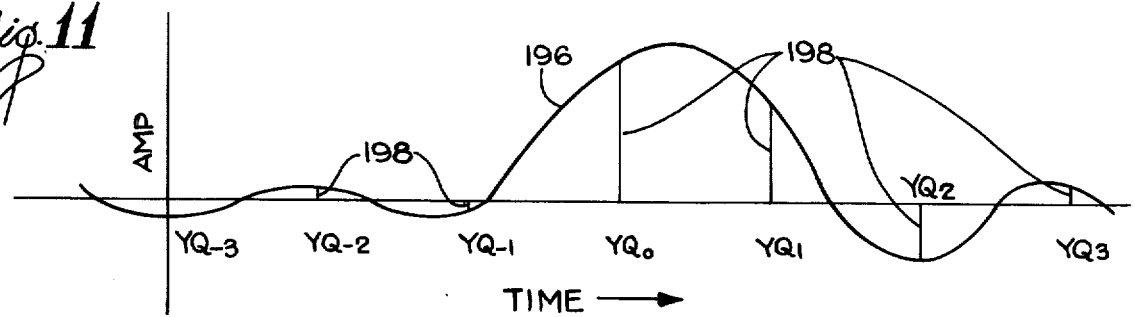
Fig. 12
| ΔT | YQ₀ | YQ₁ | YQ₁ / (YQ₁ + YQ₀) | .67 YQ₁/YQ₀ |
|---|---|---|---|---|
| .25 | .92 | .36 | .28 | .26 |
| .15 | .97 | .21 | .18 | .15 |
| .05 | .99 | .07 | .07 | .05 |
| -.05 | 1.0 | -.05 | -.05 | -.03 |
| -.15 | .98 | -.16 | -.14 | -.11 |
| -.25 | .93 | -.25 | -.21 | -.18 |

ULTRAFAST ADAPTIVE DIGITAL MODEM

BACKGROUND OF THE INVENTION

1. Field of the Invention

This invention relates generally to digital data modems and more specifically to such modems which have a capability for rapidly adapting to the characteristics of a communication channel.

2. Description of the Prior Art

Multipoint communication networks typically include a master station which selectively communicates with one of a plurality of slave stations. The number of slave stations varies with a particular installation between five and twenty stations, for example. A transmitter and a receiver in the master station are coupled by telephone lines to a transmitter and a receiver at each of the slave stations.

In communication networks of this type, the transmitter of the master station and the receivers of the slave stations are on-line at all times. The master station polls, in turn, each of the slave stations to ascertain if there is any data to be transmitted. If a particular slave station has data to send to the master station, it will respond to a "polling" signal by sending an "acknowledge" signal, followed by the data to be transmitted.

Before the receiver in the master station can accurately receive data from one of the slave stations, it must adapt its characteristics to the characteristics of the telephone lines. These characteristics of the telephone lines will vary with each of the slave stations due primarily to the variations in the distances of the respective slave stations from the master station. Once the receiver has adapted to the telephone lines, the relatively slow methods of the prior art may be sufficient to track the changing line characteristics. However, when a receiver first goes "on-line" its characteristics may differ significantly from those of the telephone lines. Under these "start-up" conditions, the relatively slow tracking methods of the prior art may take as long as two seconds to adapt the receiver to the line. This period of adaptation, which is multiplied by the number of slave stations for a single polling of the network, has significantly reduced the data throughput of the prior art systems.

Various attempts have been made to provide special start-up procedures to facilitate the fast adaptation of the receiver to the telephone lines. Typically, a special data sequence is transmitted by the transmitter to provide a signal with known characteristics in the receiver. In response to this special sequence, timing and phase error signals have been produced. These error signals have been highly dependent upon the accuracy of an automatic gain control in the receivers. As a consequence, there has been a high probability of incorrect timing and phase learning.

Although these adaptation techniques of the prior art have been somewhat effective, it is always desirable to reduce the adaptation time of a receiver. Any such reduction in time is multiplied by the number of stations in the multipoint communication network to provide a significant reduction in the adaptation time associated with a single polling of the network. It is further desirable to provide phase timing and equalization update signals which are independent of signal magnitude.

SUMMARY OF THE INVENTION

The modem of the present invention has properties for adapting not only its phase and timing characteristics, but also its equalization characteristics to a particular communication channel. This adaptation is accomplished within thirty milliseconds after transmission of the "polling" signal. This extremely short period of time is of particular advantage during the polling of a multipoint communication network since as many as twenty slave stations can be polled within a period of only one second, or less. Of further advantage are the particular timing and phase error signals which are derived independently of the amplitude of the received signal. This independent relationship is desirable since the adaptation is less dependent upon the accuracy of the automatic gain control. As a result, there is less possibility of incorrect timing and phase learning.

This fast learn technique is particularly adapted for use with a transmitter and a receiver both having first and second channels. In accordance with the present invention, a data preamble is transmitted in the first channel while there is no transmission in the second channel. This preamble includes a carrier, a modulated tone, and a pair of impulses.

In the receiver, the carrier in the preamble can be used to detect transmission and adjust the automatic gain control. During the modulated tone, the phase error is computed as the function of the arc tangent of a quotient formed by dividing the signal in the second channel by the signal in the first channel. To insure that this quotient does not approach infinity, a fast learn network can initially determine if the phase error is greater than 45°. If it is, a course phase jump of 60° can be provided so that the quotient is not greater than unity.

Also in response to the modulated tone, the timing can be adjusted as a function of the arc tangent of a quotient formed by dividing the present signal in the one channel by the immediately preceding symbol in the one channel. A corresponding phase jump can be computed from the timing jump.

In order to provide a final adjustment of the timing, a first impulse can be transmitted to provide signal components across a substantial frequency spectrum.

Following this final timing correction, a second impulse can be transmitted to facilitate equalization adaptation. A final phase correction may be desirable before this equalization adjustment is made. This phase correction, which is computed from the major sample of the impulse response, can be used to correct the phase of the lead-in samples of the impulse response by storing these lead-in samples and making a subsequent phase correction of these samples.

The equalization adjustment can then be made by computing equalizer coefficients from the impulse response samples. With these phase, timing and equalization adjustments associated with the apparatus and method of the present invention, the receiver is prepared for the normal reception of data.

These and other features and advantages of the present invention will become more apparent with a description of preferred embodiments in conjunction with the associated drawings.

DESCRIPTION OF THE DRAWINGS

FIG. 5 is a fast learn preamble which can be used in conjunction with the fast learn network of the present invention;

FIG 6 is a flow chart illustrating a preferred method of the present invention;

FIG. 7 illustrates a modulated tone which can be used in conjunction with the initial phase and timing corrections of the preferred method;

FIG. 8 is a phase diagram illustrating the effects of a 60° phase jump in response to phase errors greater than 45°;

FIG. 9 is a table showing the maximum phase errors when a 60° jump is made in response to phase errors greater than 45°;

FIG. 10 is a timing diagram illustrating the effects of timing corrections in accordance with the preferred method of the invention;

FIG. 11 is an impulse response illustrating major and minor samples produced by a converter in the receiver;

FIG. 12 is a table illustrating timing errors calculated in accordance with a preferred method of the present invention.

DESCRIPTION OF PREFERRED EMBODIMENTS

Figure 1:
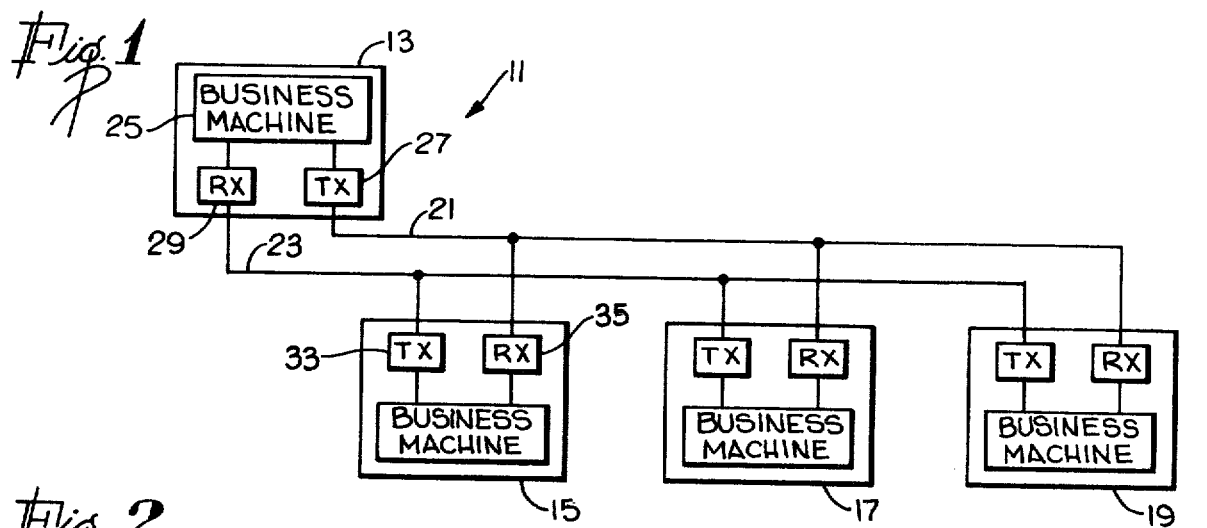
FIG. 1 is a block diagram of a multipoint communication network including a master station communicating through telephone lines with a plurality of slave stations each including a transmitter and a receiver having the features of the present invention.

A multipoint communication network is illustrated in FIG. 1 and designated generally by the reference numeral 11. The communication network 11 includes a master station 13 and a plurality of slave stations 15, 17, and 19 which transmit data over telephone lines 21 and 23. The master station 13 typically includes a business machine 25, and a modem characterized by a transmitter 27 and a receiver 29. The business machine 25 interfaces with the telephone lines 21 through the transmitter 27, and interfaces with the telephone lines 23 through the receiver 29.

In this type of communication network 11, each of the slave stations 15, 17, and 19 includes a business machine 31 and a modem characterized by a transmitter 33 and a receiver 35. At each of the slave stations 15, 17, and 19, the business machine 31 interfaces with the telephone lines 23 through the associated transmitter 33, and interfaces with the telephone lines 21 through the associated receiver 35. Although only three slave stations 15, 17, and 19 are illustrated in FIG. 1, it will be understood that the communication network 11 can include any number of slave stations.

The telephone lines 21 and 23 may be those designated by the Bell System as unconditional telephone channels. These channels are lease lines which include a pair of wires for each of the telephone lines 21 and 23.

The procedure for transmitting data in such a communication network 11 begins when the master station 13 selectively polls each of the slave stations 15, 17, and 19 to determine if there is any data to be transmitted. If the business machine 31 in the slave stations 15, 17, and 19 has no data to send, it typically responds to the poll by transmitting a "not acknowledge" signal. In the American Standard Code for Information Interchange, such a signal is encoded NAK. Even though this message may be very short, the receiver 29 at the master station 13 must still adapt to the characteristics of the telephone line 23 before it can accurately receive this signal or any data. These characteristics of the telephone channel 23 will vary with each of the slave stations 15, 17, and 19.

In the past, each adaptation of the receiver 29 to the characteristics of the telephone line 23 has taken a considerable amount of time, such as two seconds. In networks including as many as twenty slave stations for example, the total adaptation time has been as great as forty seconds. During this period of time no data has been transmitted and, as a consequence, the throughputs of the prior art systems have been significantly reduced.

A feature of particular advantage to the modem of the present invention is its capability for adapting to the characteristics of a telephone line in a period as short as thirty milliseconds. This feature is of particular advantage to the receiver 29 of the master station 13 and the transmitters 33 of the slave stations 15, 17 and 19. the receiver 29 must communicate individually with each of the transmitters 33 and therefore must individually adapt to the respective telephone line associated with each of the transmitters 33.

These "fast learn" characteristics may not be as advantageous in the transmitter 27 of the master station 13 and the receivers 35 of the slave stations 15, 17 and 19. These transmitter and receivers are "on-line" at all time so that they need adapt to each other only when initially turned on. The transmitter 27 communicates simultaneously with all of the receivers 35. Thus the individual receiver 35 will adapt to the associated telephone line and maintain that adaptation until it is turned off. In a preferred embodiment of the network 11, the transmitter 27 and the receivers 35 can be those disclosed and claimed by applicants in their copending application for an AUTOMATIC DIGITAL MODEM, Ser. No. 342,657, filed on Jan. 18, 1973, and assigned of record to the assignee of record of the present application.

The transmitter and receiver of the present invention can be of the general type disclosed and claimed by the applicants in their copending application for a DATA TRANSMISSION SYSTEM USING OPTIMAL EIGHT-VECTOR SIGNALING SCHEME, Ser. No. 506,208, filed on Sept. 16, 1974 and assigned of record to the assignee of record of the present application. In addition to the features disclosed in that system, the modem of the present invention has a "fast learn" capability for rapidly adapting the modem to the characteristics of the telephone line 23.

Figure 2:
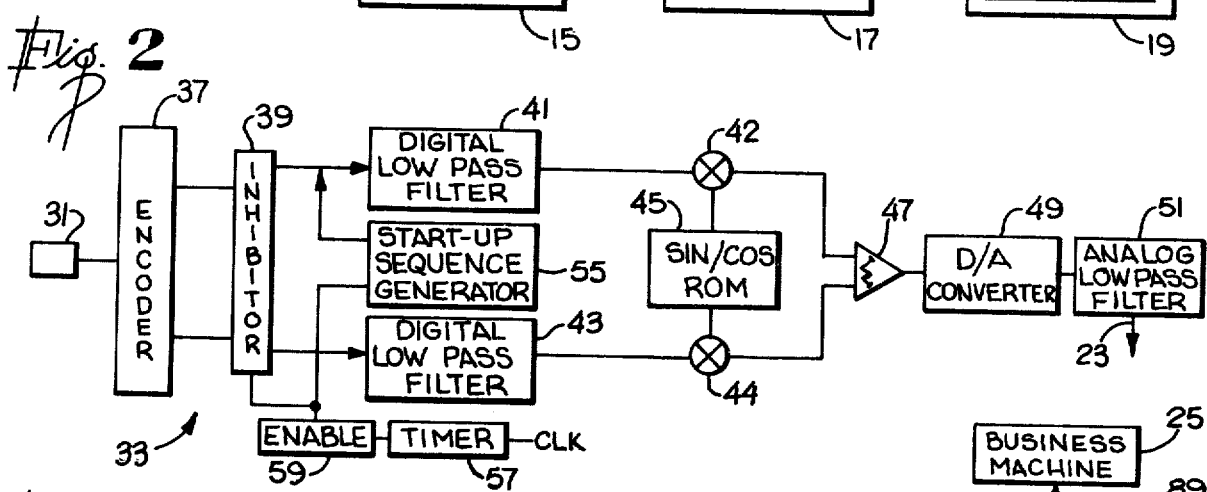
FIG. 2 is a block diagram of one of the transmitters illustrated in FIG. 1.

FIG. 2 illustrates in greater detail the transmitter 33 at one of the slave stations 15, 17, and 19. The business machine 31 provides a plurality of data words designated herein by the symbol $d_j$ where the sub $j$ implies the jth data word. Following the associated business machine 31, the transmitter 33 includes an encoder 37 which is adapted to receive the digitized data $d_j$ from the business machine 31 at a particular rate, such as 4800 bps. Within the encoder 37, incoming data is randomized and differentially encoded to provide a $DI_j$ symbol in an inphase or I channel, and a $DQ_j$ symbol in a quadrature or Q channel. A randomizer suitable for use in the encoder 37 is that described by Doelz in his U.S. Pat. No. 3,688,196. A differential encoder suitable for use in the encoder 37 is that described by McAullife in his U.S. Pat. No. 3,701,948.

Each of the data sumbols $DI_j$ and $DQ_j$ expresses one of a plurality of data levels, the number of which depends on the speed of operation. For 4800 bps operation, the symbols will typically express one of three levels (such as ±1.732,0) in one of the I and Q channels, and one of five levels (such as ±2,±1,0) in the other of the I and Q channels. The digital symbols will typically occur at the sample rate of 1600 per second so that the interval of time between adjacent symbols is 1/1600 seconds. This interval is commonly referred to as the baud interval and the frequency of occurrence of the symbols is referred to as the baud rate. At the baud rate of 1600 symbols per second, the throughput of the modem is 1600 symbols per second, times three bits per symbol, or 4800 bits per second.

Properly encoded, the input data symbols are passed through an inhibitor 39 (described in greater detail below), and introduced to a pair of digital lowpass filters 41 and 43 in the I and Q channels, respectively. These filters 41 and 43, in combination with similar filters in the receiver 29, can be adjusted to provide the system with an ideal impulse response.

After being appropriately filtered, the signals in the I and Q channels can be introduced to multipliers 42 and 44, respectively, wherein they are multiplied at a carrier frequency, such as 1600 Hertz, by digital quantities from a sine/cosine ROM 45. These modulated signals can then be combined in an adder 47, converted to analog format in a digital-to-analog converter 49, and smoothed by an analog lowpass filter 51. In its analog format the signal is then introduced into the telephone lines 23.

The transmitter 33 also includes a start-up sequence generator 55 which is controlled by a timer 57. The timer 57 is typically clocked at the baud rate.

In response to the polling signal from the transmitter 27, the inhibitor 39 prevents the data from the encoder 37 from passing to the digital lowpass filters 41 and 43. At the same time, the start-up sequence generator 55 introduces into the I channel a known sequence of data. No data is transmitted in the Q channel. As will be explained in greater detail below, the generator can also be connected to introduce the known sequence of data into the Q channel, in which case no data is transmitted in the I channel.

The known sequence of data in the I channel is used by the receiver 29 to facilitate its adaptation to the telephone lines 23. Both the inhibitor 39 and the start-up sequence generator 55 are activated in response to the polling signal by the timer 57 operating through an ENABLE gate 59. The ENABLE gate 59 functions as a switch providing a closed circuit in a first state, and an open circuit in a second state. At the completion of the start-up sequence, the timer 57 changes the state of the ENABLE gate 59 to inhibit the generator 55 and to permit the transmission of data from the encoder 37 into the respective I and Q channels.

The signal transmitted through the telephone line 23 may be distorted to a greater or lesser extent depending on the quality of the line 23. For example, the line 23 may cause the entire data spectrum to shift; this is typically referred to as frequency offset. If the telephone line 23 is of poor quality, it will typically produce phase jitter so that the carrier phase of the received signal varies in a sinusoidal manner with respect to the carrier phase of the transmitted signal. There may also be an initial difference between the carrier phase of the transmitter 33 and the carrier phase of the receiver 29. This is commonly referred to as phase offset.

The telephone line 23 will also typically produce asymmetrical as well as symmetrical delay and attenuation distortion. This distortion is based on the treatment the telephone line 23 gives each particular frequency in the spectrum with respect to the carrier frequency. For example, some of the frequencies of the spectrum will experience a greater delay than other frequencies in the spectrum. Similarly, the telephone line 23 may attenuate some frequencies more than others. It is, of course, desirable that the receiver 29 be able to compensate for all of these undesirable characteristics of the telephone line 23 in order to minimize the differences between the signal received and the signal transmitted. It is further desirable that the receiver 29 be capable of adapting to the telephone line 23 in as short a period as possible to minimize the time devoted to operations other than the transmission of data.

Figure 3:
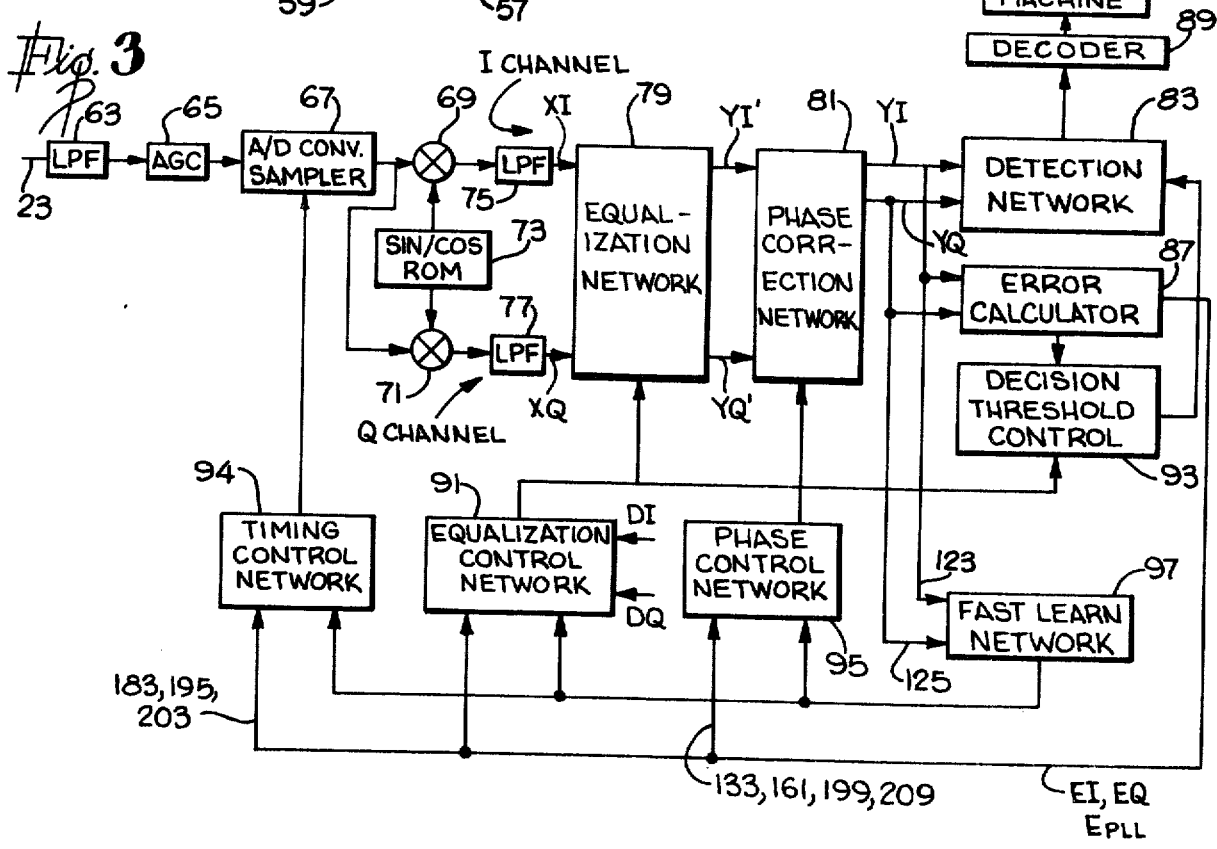
FIG. 3 is a block diagram of one of the receivers illustrated in FIG. 1 and including a fast learn network for rapidly adapting the timing, phase and equalization of the receiver to the characteristics of the telephone lines.

The receiver 29 is illustrated in greater detail in FIG. 3. This receiver 29 has characteristics for adapting to a telephone line such as the line 23 in thirty milliseconds or less to minimize the delay prior to which the data can be accurately received.

The receiver 29 will typically receive the input analog signal from the telephone line 23 and will pass this signal through an analog filter 63 and an automatic gain control 65. The filter 63 selects the desired passband, and the automatic gain control 65 provides the desired signal level. An analog-to-digital converter 67, which may include a sampler, is provided to sample and digitize the incoming analog signal at a rate, such as 6400 times per second, corresponding to some multiple of the symbol or baud rate of the transmitter 33.

In a conventional manner the converter 67 is controlled by a timing signal which is characterized by a stream of clock pulses. The converter 67 responds to each of the pulses by taking a single sample of the analog signal and by expressing the amplitude of the sample as a digital number. The pulses in the timing signal are separated by a timing interval which can be adjusted to vary the sampling rate of the converter 67.

It will be noted that in this embodiment the signals throughout the remainder of the receiver 29 have a digital format.

The digital signals from the converter 67 can be separately multiplied in each of a pair of multipliers 69 and 71 by quantities from a sine/cosine ROM 73. In this manner, the signal can be noncoherently demodulated and separated into an I channel and a Q channel in the receiver 29.

From the multipliers 69 and 71 the signals can be introduced to a pair of digital lowpass filters 75 and 77 in the respective I and Q channels to select the desired baseband from the demodulated signals. It is the filters 75 and 77 in the receiver 29 which were previously referred to as being adjusted with the filters 41 and 43 in the transmitter 33 to provide an ideal impulse response. In a preferred embodiment, the filters 41, 43 and the filters 75, 77 are adjusted to provide raised cosine signaling. This type of signaling is generally preferred to partial response signaling since the former provides a faster response time. Partial response signaling provides a narrow data spectrum which may be advantageous for transmitting data through communication channels having narrow bandwidths. In contrast, raised cosine signaling provides a wider data spectrum and a faster response time that is particularly desirable for providing the modem with "fast-learn" characteristics. The signals at the outputs of the filters 75 and 77 are commonly designated XI and XQ in the respective I and Q channels.

Following the filters 75 and 77, the two baseband signals in the I and Q channels can be introduced to an equalization network 79. This network 79 corrects for the asymmetrical as well as the symmetrical delay and attenuation distortion caused by the telephone line 23. At the output of the equalization network 79, the equalized signals in the I and Q channels are commonly designated YI' and YQ'.

The equalized signals YI' and YQ' can then be introduced to a phase correction network 81 which compensates for the frequency offset, phase offset, and phase jitter caused by the telephone line 23. At the output of the phase correction network 81 the equalized and phase corrected signals in the I and Q channels are commonly designated YI and YQ.

Following phase correction, the signals in the I and Q channels can be detected in a detection network 83 similar to that described and claimed in applicant's copending application Ser. No. 506,208 previously discussed. At the output of the detection network 83, the detected signals are commonly designated DI and DQ. Symbols forming the signals DI and DQ can be expressed in terms of the data $d_j$ as follows;

| DATA | $DI_j$ | $DQ_j$ |
|------|--------|--------|
| 000  | 0      | 1.732  |
| 001  | 2.0    | 1.732  |
| 010  | 1.0    | 0      |
| 011  | 2.0    | −1.732 |
| 100  | 0      | −1.732 |
| 101  | −2.0   | −1.732 |
| 110  | −1.0   | 0      |
| 111  | −2.0   | 1.732  |

From the output of the detectors 83 and 85 the signals DI and DQ, together with the signals YI and YQ from the network 81, can be introduced to an error calculator 87. In a preferred embodiment, the error calculator 87 provides an error signal for updating the sampling rate of the converter 67, the equalization of the network 79, and the phase correction of the network 81. It is of particular advantage to the receiver 29 that with the provision of a single error calculator 87 which relies solely upon incoming data, the timing, equalization, and phase correction of the receiver 29 can be corrected to compensate for the deficiencies of the incoming signal. With the correction of these characteristics, the detected data from the detection network 83 can be introduced to a decoder 89 wherein the signals are differentially decoded, derandomized, and introduced to the business machine 25 at the master station 13.

The error calculator 87 provides error signals EI and EQ in the respective I and Q channels. These signals can be expressed as follows:

$$EI = YI - DII_o \text{ and}$$

$$EQ = YQ - DQI_o$$

where:

YI and YQ are the equalized, phase corrected signals in the respective I and Q channels, DI and DQ are the detected signals, and $I_o$ is an updated estimate of the value $I_o$ of the impulse response of an ideal signal.

An equalization control network 91 is responsive to the error signals EI and EQ and the partial response detected signals DI and DQ to provide equalization error signals which control the equalization network 79. The control network 91 is described in greater detail in applicant's copending application for an EQUALIZER, Ser. No. 405,290, filed on Oct. 11, 1973 and assigned of record to the assignee of record of the present application. This equalization network 79 is adapted for use with raised cosine signaling as disclosed in applicant's copending application Ser. No. 506,208, previously mentioned.

These equalization error signals from the control network 91 are also introduced to a decision threshold control 93 which generates the quantity $I_o$. This quantity $I_o$ is used to establish thresholds for the detection network 83 and is also used to calculate the error terms EI and EQ in the manner previously discussed.

A timing control network 94 can be made responsive to the EI and EQ signals from the error calculator 87 to control the timing of the sampler 67. The timing control network 94 can be of the type disclosed and claimed in applicant's copending application for a DIGITAL DATA MODEM WITH AUTOMATIC TIMING AND CONTROL, Ser. No. 405,574, filed on Oct. 11, 1973 and assigned of record to the assignee of record of the present application. The timing control network 94 can also be of the type responsive to a particular signal in the equalization network 79 as disclosed and claimed in applicant's copending application for TIMING RECOVERY FOR AN AUTOMATICALLY EQUALIZED DATA MODEM, Ser. No. 565,211 filed on Sept. 11, 1974, and assigned of record to the assignee of record of the present application. Both of these types of timing control networks are adaptable for use with the raised cosine signaling preferred in the modem of the present invention.

The error calculator 87 also provides a signal $E_{PLL}$ which can be derived from the error terms EI and EQ. This signal $E_{PLL}$ can be introduced to a phase control network 95 which provides signals to the phase correction network 81 for updating the phase characteristics of the receiver 29. The phase control network 95 is described in greater detail in applicant's copending application for a PHASE CORRECTION NETWORK, Ser. No. 376,464, filed on July 5, 1973, and assigned of record to the assignee of record of the present application. This phase correction network 95 is also adaptable for use with the raised cosine signaling preferred in the present invention.

The apparatus providing for the fast adaption of the receiver 29 to the telephone line 23 is controlled primarily by a fast learn network 97. This network 97 is shown as a block in FIG. 3 and in greater detail in FIG.

4. The fast learn network 97 is adapted to receive the signals YI and YQ from the output of the phase correction network 81. These signals YI and YQ include a plurality of digital symbols each occurring as a result of the sampling by the converter 67. For example, the YI signal includes a present symbol $YI_0$ occurring in the present baud interval and a symbol $YI_{-1}$ occurring in the preceding baud interval. Similarly, the YQ symbol includes a present symbol $YQ_0$ occurring in the present baud interval and a symbol $YQ_{-1}$ occurring in the preceding baud interval.

Prior to the transmission of data in the telephone line 23, the transmitter, such as the transmitter 33, sends a special fast learn preamble to the receiver, such as the receiver 29. This preamble can be similar to that illustrated in FIG. 5 and designated by the reference numeral 99. The preamble 99 for a preferred embodiment of the invention has five time periods each of which may be equal to ten baud intervals. These time periods are defined by the times $T_0$ to $T_7$ shown in FIG. 5.

During the first time interval, $T_0 - T_1$, an unmodulated carrier 101 is transmitted. This carrier may be the same as the data transmission carrier which in a preferred embodiment has a frequency of 1600 Hertz. During the second time interval, $T_1 - T_4$, the carrier is modulated by a particular frequency to produce a modulated tone 103. The particular frequency may be one-fourth the frequency of the carrier which in a preferred embodiment is 400 Hertz.

At the end of the third time interval, $T_4 - T_5$, a first impulse 105 is transmitted. Similarly, at the end of the fourth time period, $T_5 - T_6$, a second impulse 107 is transmitted. After a delay associated with the fifth time period, $T_6 - T_7$, the normal transmission of data can begin.

The times $T_0$ to $T_7$ correspond to functions which are carried out in the receiver 29 in accordance with a flow chart illustrated in FIG. 6. During the first time interval, $T_0 - T_1$, the receiver 29 detects the carrier and permits the automatic gain control 65 to adjust the received signal to a predetermined value. This function is shown in the flow chart of FIG. 5 by a block 109. After a period such as ten bauds, the signals should be sufficiently adjusted to permit further adaptation of the receiver 29 to the timing, phase and equalization characteristics of the telephone lines 23.

During the second time interval, $T_1 - T_4$, the modulated tone 103 (FIG. 4) is introduced to receiver 29. In response to this modulated tone 103, a course phase jump is made between the time $T_1$ and a time $T_2$, as shown in FIG. 6 by a block 110. A second phase jump is made between the time $T_2$ and a time $T_3$ as shown by a block 112. From the time $T_3$ to the time $T_4$, both timing and phase jumps are made as shown by a block 114.

At the end of the third time interval $T_4 - T_5$, the impulse 105 is transmitted and the timing and phase of the receiver 29 are both jumped in accordance with a block 116, illustrated in FIG. 6. Phase correction is also made at the end of the fourth time interval, $T_5 - T_6$, in response to the second impulse 107. This phase correction is illustrated by a block 118 in FIG. 6. An equalization adjustment, shown by a block 120, is also made in the fourth time interval after the phase correction associated with the block 118. After a suitable delay associated with the fifth time period, $T_6 - T_7$, normal operation of the receiver 29 can begin as shown by a block 122 in FIG. 6.

With more specific reference to the second time interval, $T_1 - T_4$, it was found that phase adjustments in a quadrature modulated system could be most expeditiously accomplished by transmitting a tone in one of the I and Q channels and then measuring the phase error. It was found that a particularly accurate and easily implemented phase error measurement can be made by taking the arc tangent of a quotient formed by dividing the signal in the one channel by the signal in the other channel. For example, if the fast learn preamble 99 is transmitted in the Q channel, the phase error can be measured in accordance with the following equation:

$$\Delta \phi = - \text{ARCTAN} \left( \frac{YI_0}{YQ_0} \right) \quad \text{(Equation 1)}$$

where:

$YI_0$ is the symbol occurring in the I channel at the output of the phase correction network 81 during the present baud interval; and $YQ_0$ is the symbol occurring in the Q channel at the output of the phase correction network 81 during the present baud interval.

If the preamble 99 were transmitted in the Q channel and there were no phase error, the symbol $YI_0$ would be equal to zero. Thus, the quotient $YI_0/YQ_0$ would be equal to zero and the ARCTAN of the quotient would also be zero. Under these circumstances, the quantity $\Delta\phi$ would be equal to zero indicating no phase error.

It has also been found that the arc sine of the quotient $YI_0/YQ_0$ can give similar results. Thus, if there is no phase error, and the signal $YI_0$ is equal to zero, then the arc sine of the quotient would also be zero. In a particular embodiment, however, it may be more desirable to use the arc tangent function since this function in the range between 0° and 45° goes from 0 to 1. On the other hand, the sine function in the range from 0° to 45° goes from a magnitude of 0 to only 0.707. Thus the arc tangent function provides a greater accuracy for the lower values of phase error which are more typical.

On the other hand, there may be some difficulty in obtaining the tangent function for angles between 45° and 90°. In this range, the tangent function goes from unity to infinity. Since it is difficult to maintain accuracy over such a wide range of values, it may first be desirable to insure that the phase error is less than 45°. This is achieved in a preferred embodiment which provides for a fixed phase jump of approximately 60° when the magnitude of $YI_0$ is greater than or equal to the receiver reference level $I_o$.

This can be more easily understood with reference to the 400 Hertz demodulated tone illustrated in FIG. 7. If there were no timing error, this 400 Hertz tone would be sampled at the times corresponding to the lines 111. If the timing error is at a maximum value of one-half baud, the samples would be taken at times corresponding to the lines 113. This maximum timing error, which corresponds to one-half baud in a preferred embodiment, will produce symbols, alternate ones of which would have a magnitude of 2.45 $I_o$. With no timing error, the samples will have a value of 1.732 $I_o$. These magnitudes are illustrated by a pair of circles 115 and 117, respectively, in FIG. 8.

A pair of vectors 119 and 121 associated with the circles 115 and 117, respectively, are drawn with $YI_0$ components equal to $I_o$. The angular difference between these vectors 119 and 121 and the Q axis is the phase error $\Delta\phi$ to be corrected. It can be seen that if there is no timing error, corresponding to the vector 119, and the $YI_0$ component is less than $l_o$, the maximum phase error will be 35.3 degrees. In comparison, if the timing error is at a maximum, corresponding to the vector 121, and the $YI_0$ component is less than $l_o$, the maximum phase error is 24.1 degrees. In either case, if the $YI_0$ component is less than $l_o$, the phase error (without regard to the timing error) will be less than 45°. Thus, the arc tangent function would be particularly desirable for determining the magnitude of the phase error if $YI_0$ is less than $l_o$.

If the magnitude of the $YI_0$ component is greater than $l_o$, the reference phase in the receiver 29 can be jumped 60° to bring the phase error within a magnitude of less than 45°. For example, if the $YQ_0$ component is equal to 0, indicating a phase error of 90°, a 60° jump will reduce the phase error to 30° without regard to the timing error. At the other extreme when $YI_0$ is equal to $l_o$, a 60° jump with a timing error of 0 corresponding to the vector 119 would produce a phase errror of 24.7°. A 60° jump with a maximum timing error corresponding to the vector 121 would produce a phase error of 35.9°. These values are tabulated in FIG. 9. In can be seen that if $YI_0$ is less than $l_o$ the phase error is less than 45°. If $YI_0$ is greater than or equal to $l_o$, a 60° jump of the reference phase will bring the phase error within a magnitude less than 45°. Under these circumstances, the arc tangent function for determining phase error in accordance with Equation 1 is particularly desirable.

The 60° phase jump associated with the block 110 in FIG. 6 can be determined in accordance with the following equation:

$$\Delta\phi = -60° \, \text{SGN}(YI_0 YQ_0) \qquad \text{(Equation 2)}$$

The direction of the 60° jump is dependent upon the sign of the quantity $\Delta\phi$ determined in accordance with Equation 2. If the sign of $\Delta\phi$ is negative, the phase of the reference can be adjusted in a clockwise direction in FIG. 8. If the sign is positive, the phase of the reference can be adjusted in a counterclockwise direction in FIG. 8.

Figure 4:
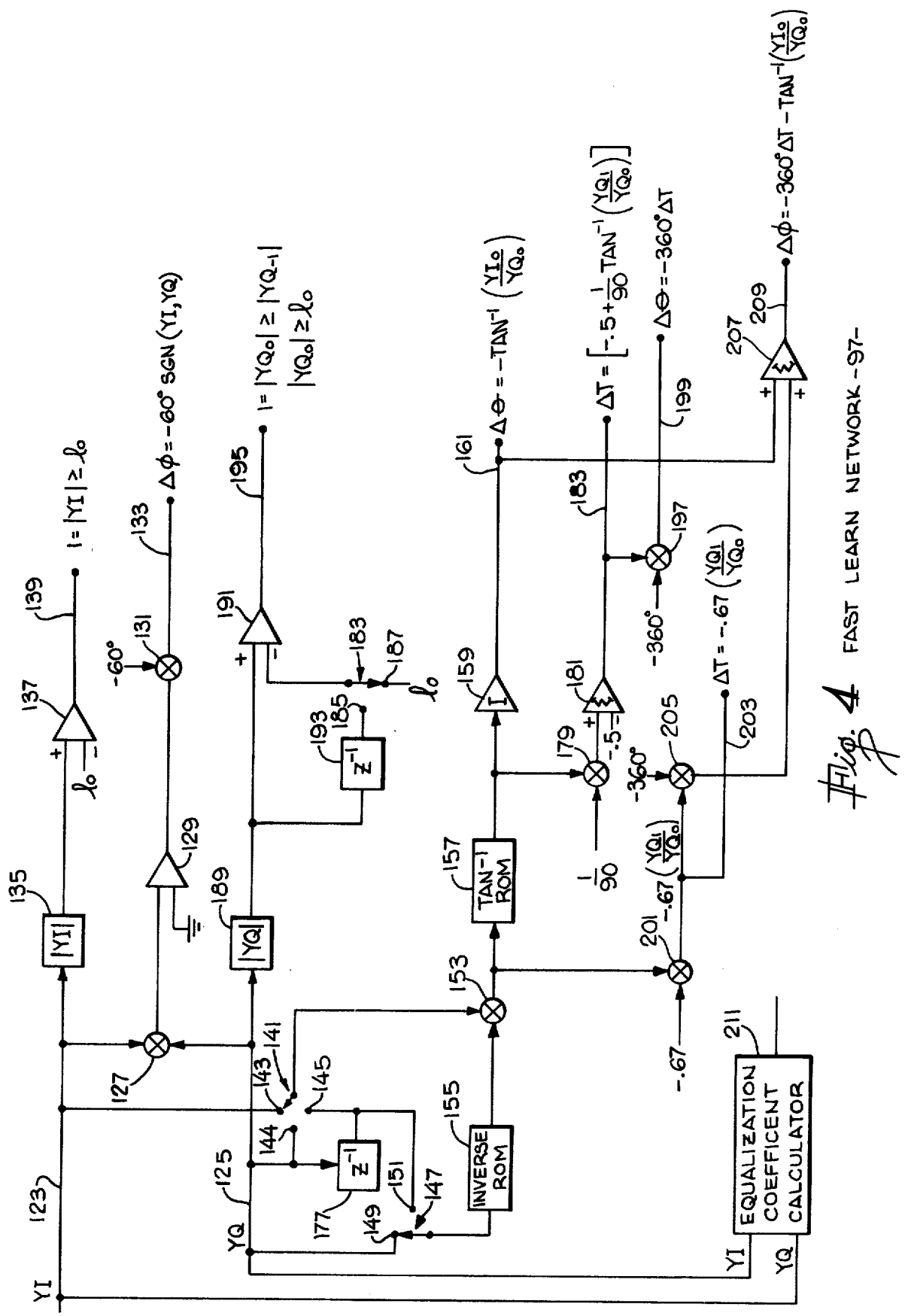
FIG. 4 is a block diagram of the fast learn network illustrated in FIG. 3.

The signal $\Delta\phi$ computed in accordance with Equation 2 can be derived by the fast learn network illustrated in detail in FIG. 4. This fast learn network 97 receives the signals $YI_0$ and $YQ_0$ on a pair of conductors 123 and 125, respectively. Both of these signals are multiplied in a multiplier 127 to provide at a comparator 129 the resulting product. The comparator 129 introduces the sign of this product to a multiplier 131 which also receives the factor −60°. At the output of the multiplier 131, the signal $\Delta\phi = -60°\,\text{SGN}\,(YI_0\,YQ_0)$ is provided on a conductor 133. If the vector component $YI_0$ is greater than or equal to $l_o$, this $\Delta\phi$ signal on the conductor 133 can be used to jump the phase of the reference.

The magnitude of $YI_0$ can be determined by introducing the $YI_0$ signal on the conductor 133 to a magnitude extractor 135 and comparing the resulting signal to the quantity $l_o$ in a comparator 137. The output of the comparator 137 provides a signal on a conductor 139 when the magnitude of the $YI_0$ component, is at least as great as the magnitude of $l_o$. This signal on the conductor 139 could be used to switch the $\Delta\phi$ signal on the conductor 133 into the phase control network 95.

Having insured that the phase error is less than 45°, the phase correction set forth in Equation 1 can be more readily derived to determine the exact phase error. This computation can be made in accordance with the structure illustrated in FIG. 4 wherein the network 97 includes a switch 141 having a first position, a second position, and a third position corresponding to terminals 143, 144 and 145. A second switch 147 has first and second positions corresponding to a pair of terminals 149 and 151. When these switches 141 and 147 are in their first positions, the conductor 123 can be connected to the terminal 143 to introduce the signal $YI_0$ through the switch 141 to a multiplier 153. The conductor 125 can be connected to the terminal 149 to introduce the signal $YQ_0$ through the switch 147 to an inverse ROM 155. The signal $1/YQ_0$ at the output of the ROM 155 can also provide a factor in the multiplier 153. The resulting product $YI_0/YQ_0$ can then be introduced to an ARCTAN ROM 157 to provide the quantity ARCTAN $YI_0/YQ_0$. Introducing this signal through an inverter 159 provides the phase error signal $\Delta\phi = -\text{ARCTAN}\,(YI_0/YQ_0)$ on the conductor 161. This signal on the conductor 161 can be introduced into the phase control network 95 as illustrated in FIG. 3. In the phase control network 95, the reference phase angle is adjusted $\Delta\phi$ degrees so that it corresponds to the phase angle of the received signal.

In the foregoing manner, both the coarse and fine phase jumps shown by the blocks 110 and 112 in FIG. 6, can be made using the modulated tone 103 illustrated in FIG. 5.

With the phase of the receiver 29 correctly adjusted, the timing may also be adjusted using the modulated tone 103 in accordance with the following equation:

$$\Delta T = -.5 + \frac{1}{90}\text{ARCTAN}\left(\frac{YQ_{-1}}{YQ_0}\right) \qquad \text{(Equation 3)}$$

where
$YQ_0$ is the signal in the Q channel in the present baud interval;

$YQ_{-1}$ is the signal in the Q channel in the previous baud interval; and the magnitude of $YQ_0$ is greater than or equal to the magnitude of $YQ_{-1}$.

The computation of timing error in accordance with Equation 3 can be more easily understood with reference to the timing diagram illustrated in FIG. 10. In this timing diagram, sample times are illustrated by equally spaced vertical lines 163, 165, 167 and 169. Each adjacent pair of these lines 163–169 defines a baud interval.

A signal 171 is illustrated to indicate accurate timing by the converter 67. When the timing is accurate, samples taken at the times corresponding to the lines 163–169 will be equal in magnitude. A signal 173 is also illustrated which leads the signal 171 by one quarter baud. It will be noted that a sample of the signal 173 taken at a time corresponding to the line 165 would be greater in magnitude than a sample taken at a time corresponding to the line 163. Thus the condition of magnitude $YQ_0$ greater than or equal to the magnitude $YQ_{-1}$ would be satisfied, and the timing error in accordance with Equation 3 could be determined in the baud interval defined by the lines 163 and 165.

In contact, a signal 175 is illustrated which lags the signal 171 by one quarter baud. A sample of the signal 175 taken at a time corresponding to the line 165 would have a lesser magnitude than a preceding signal taken at a time corresponding to a line 163. Under these conditions, it would be less desirable to compute the timing error in accordance with Equation 3 because the tangent function would be greater than unity. However, the timing error can be easily and accurately determined in the baud interval defined by the lines 165 and 167. It will be noted that a sample taken at the time corresponding to the line 167 will have a greater magnitude than a sample taken at the time corresponding to the line 165. Thus the condition $YQ_0$  $YQ_{-1}$ would be satisfied.

As noted, sampling of a properly timed signal, such as the signal 171, will provide samples $YQ_0$ and $YQ_{-1}$ of equal magnitude. Thus, the quotient in Equation 3 will have a magnitude of unity and the arc tangent of this quotient will indicate an angle of 45°. When divided by the quantity 90° in Equation 3, this will produce a quotient of 0.5; and when this quotient is added to the constant −0.5 in Equation 3, the timing error $\Delta T$ is indicated to be zero.

When the timing of the receiver 29 leads the signal by 0.25 bauds, as shown by the signal 173, the tangent of $YQ_{-1}/YQ_0$ is equal to 22½°. This quantity divided by 90 provides the quotient 0.25. When this quotient is added to the constant −0.5, a timing error of −0.25 is indicated. This error instructs the receiver 29 to retard its timing to correct the timing error.

If the receiver 29 lags the signal by 0.25 bauds as shown by the signal 175, the receiver 29 will be instructed to retard its timing by 0.75 bands which is equivalent to an advance of 0.25 bauds for the 400 Hertz modulated tone 103.

The equation of Equation 3 can be implemented in accordance with the structure in the network 97, illustrated in FIG. 4. The conductor 125 can introduce the signal $YQ_0$ into a delay network 177 the output of which is connected to the terminal 145 of the switch 141. Then, with the switch 141 in the third position and the switch 147 in the first position, a signal ARCTAN $YQ_{-1}/YQ_0$ will be provided at the output of the ROM 157. This signal can be introduced to a multiplier 179 along with a signal having a magnitude equal to 1/90. The resulting product can be introduced to the positive input terminal of a summation network 181 which also receives the signal 0.5 on a negative input terminal. The resulting signal $\Delta T$, designated Equation 3 above, is provided at the output of the summation network 181 on a conductor 183.

A signal having characteristics corresponding to the condition magnitude $YQ_0$ greater than or equal to magnitude $YQ_{-1}$ can be derived by a portion of the network 97 including a third switch 183 having first and second positions corresponding to terminals 185 and 187, respectively. A signal equal to the quantity $1_0$ is maintained on the terminal 187. The conductor 125 introduces the signal $YQ_0$ into a magnitude extractor 189 which provides the signal $YQ_0$ on the positive input terminal of a comparator 191. This signal can also be introduced through a delay network 193 to provide at the terminal 185 the signal $YQ_{-1}$ which in turn can be introduced through the switch 183 in the first position on the negative input terminal of the comparator 191. On a conductor 195 at the output of the comparator 191, the signal $YQ_0$  $YQ_{-1}$ can be used to enable the timing error signal on the conductor 183 in the timing control network 94 (FIG. 3).

It is well known that when the timing is adjusted, the phase must also be corrected an amount dependent upon the magnitude of the timing shift. This corresponding phase jump can be derived from the following equation:

$$\Delta \phi = \theta (\Delta T) \quad \text{(Equation 4)}$$

where
$\Delta T$ is the timing change in percentage baud as derived in Equation 3; and
$\theta$ is the number of degrees of reference carrier per baud.

For the particular example given, $\theta$ is equal to 360° so that the phase jump corresponding to the timing jump in this particular embodiment can be computed as follows:

$$\Delta \phi = -360 \Delta T \quad \text{(Equation 5)}$$

A signal corresponding to Equation 5 can be derived by introducing the signal $\Delta T$ on conductor 183 into a multiplier 197 along with a signal having a magnitude corresponding to −360°. The resulting product provides a signal $\Delta \phi$ of Equation 5 on a conductor 199. This signal on the conductor 199 can be introduced to the phase control network 95 to update the phase of the receiver reference simultaneously with the timing adjustments.

During the third time interval, $T_4 - T_5$, the first impulse 105 is transmitted in the preamble 99. In general, an impulse such as the impulse 105 is particularly useful in making the fine timing and phase corrections. While the carrier modulated tone 103 provides a typical double sideband signal which represents information only at the upper and lower sideband frequencies, an impulse has frequency compounds which cover the entire channel spectrum. As a result, an impulse provides a much more accurate channel measurement for the adaptation of the receiver 29.

A typical response of the receiver 29 to an impulse, such as the first impulse 105, is illustrated in FIG. 11 and designated by the reference numeral 196. The sampling of the impulse response 196 by the converter 67 is shown by a plurality of equally spaced vertical lines 198. These lines 198 are also designated by the associated symbols $YQ_j$. The symbols $YQ_j$ include a major symbol $YQ_0$ and minor symbols $YQ_{-1}$, $YQ_{-2}$, and $YQ_{-3}$ (commonly referred to as lead-in symbols) and $YQ_1$, $YQ_2$, and $YQ_3$ (commonly referred to as trailing symbols). It has been found that the timing error $\Delta T$ can be computed using these symbol values in accordance with either of the following two equations:

$$\Delta T = -\frac{YQ_1}{YQ_0 + YQ_1} \quad \text{(Equation 6)}$$

$$\Delta T = -.67 \left( \frac{YQ_1}{YQ_0} \right) \quad \text{(Equation 7)}$$

Both Equations 6 and 7 provide a good approximation of the timing error for impulse responses over a variety of channels.

Typical values for $YQ_1$ and $YQ_0$ are tabulated in FIG. 12 for various timing errors $\Delta T$ between 0.25 and −0.25. Also tabulated in FIG. 12 are the values of $\Delta T$ computed in accordance with FIGS. 6 and 7 for each of the timing errors. It can be seen that perhaps Equation 6 provides the most accurate approximation of the timing error $\Delta T$. On the other hand, Equation 7 gives an excellent approximation of the timing error $\Delta T$ and is easier to derive.

The signal $\Delta T$ of Equation 7 can be derived by placing the switches 141 ad 147 in their respective second positions. The product $YQ_1/YQ_0$ at the output of the multiplier 153 can be introduced to a multiplier 201 along with a factor $-0.67$. The resulting product provides the timing error signal $\Delta T$ set forth in Equation 7. This signal can be introduced on a conductor 203 to the converter 67.

When the first inpulse 105 is received, it may also be desirable to correct any accumulated phase error resulting from frequency translation. This phase correction can be accomplished in the same manner discussed with reference to the method step illustrated by the block 112 in FIG. 6. Thus a signal equivalent to that represented by Equation 1 can be derived and introduced on a conductor 161 to the phase control network 95.

As previously discussed, a phase correction will also be in order due to the timing jump made in accordance with Equation 6 or Equation 7. This corresponding phase jump for a preferred embodiment will have a magnitude equal to $\Delta \phi = -360 \Delta T$. If desired the phase jump associated with a new phase measurement and the phase jump associated with the timing jump can be combined in accordance with the following equation: introducing $\Delta$ $$\Delta \phi = -360 \Delta T - \text{ARCTAN}(\frac{YI_0}{YQ_0})$$  (Equation 8)

A signal representing Equation 8 can be derived by introducting the signal 066 T on conductor 203 to a multiplier 205 along with a factor $-360°$. This product can be introduced to a summation network 207 along with the signal $\Delta \phi$ on the conductor 161. The resulting signal, designated Equation 8 above, can be introduced on a conductor 209 to the phase control network 95.

With the correction of the phase and timing in accordance with the block 116 in FIG. 6, the receiver 29 can procced to the calculation of equalization coefficients in response to the second impulse 107. In order to properly calculate equalization coefficients from an impulse, the impulse must be isolated from transmissions both before and after the impulse by a sufficient guard time. In the absence of normal transmission, the receiver 29 will not be phase locked so that phase errors due to frequency translation in the channel may occur. If the guard time is 10 bauds, the frequency translation is 10 Hz and the baud time is 625 microseconds, for example, a phase error of 2.25° per baud will accumulate to provide a total phase error of 22½°. Such a phase error can cause as much as a 38% in the calculation of equalization coefficients.

If there is phase error, it will affect not only the major symbol $YI_0$, but also the minor symbols including the lead-in sample $YQ_{-1}$, $YQ_{-2}$, and $YQ_{-3}$. All of these symbols are of interest in the calculation of equalization coefficients. However, the detection and computation of phase error in accordance with Equation 1 is made after the lead-in samples have passed. Therefore, phase correction at that time would only affect the major symbol and the minor, trailing symbols $YQ_1$, $YQ_2$, and $YQ_3$.

In a preferred embodiment of the invention, this problem is solved by storing the previously received, lead-in samples until the major sample $YQ_0$ of the impulse occurs. By measuring the overall phase error in accordance with the Equation 1, the phase of the receiver reference can be updated in the manner previously discussed. If this phase correction takes place in the present time interval, only the major sample and the trailing samples will be affected by this phase correction.

In order to correct the phase of the lead-in samples, their stored values $YI_j$ and $YQ_j$ can be replaced by corresponding quantities $YI_j$ and $YQ_j$ computed in accordance with the following equations:

$$YI_j = YI_j \cos \Delta\phi + YQ_j \sin \Delta\phi$$
$$YQ_j = YQ_j \cos \Delta\phi - YI_j \sin \Delta\phi \qquad \text{(Equation 9)}$$

where $j$ is greater than or equal to $-3$ and less than or equal to a zero.

Following the phase correction of both the lead-in and trailing samples, these signals which will be collectively referred to as $YI_j$ and $YQ_j$, can be normalized to account for amplitude variations in accordance with the following equations:

$$YI_j = \frac{YI_j}{YQ_0}$$
$$YQ_j = \frac{YQ_j}{YQ_0} \qquad \text{(Equation 10)}$$

where $j$ is greater than or equal to 3 and less than or equal to +4.

Figure 13:
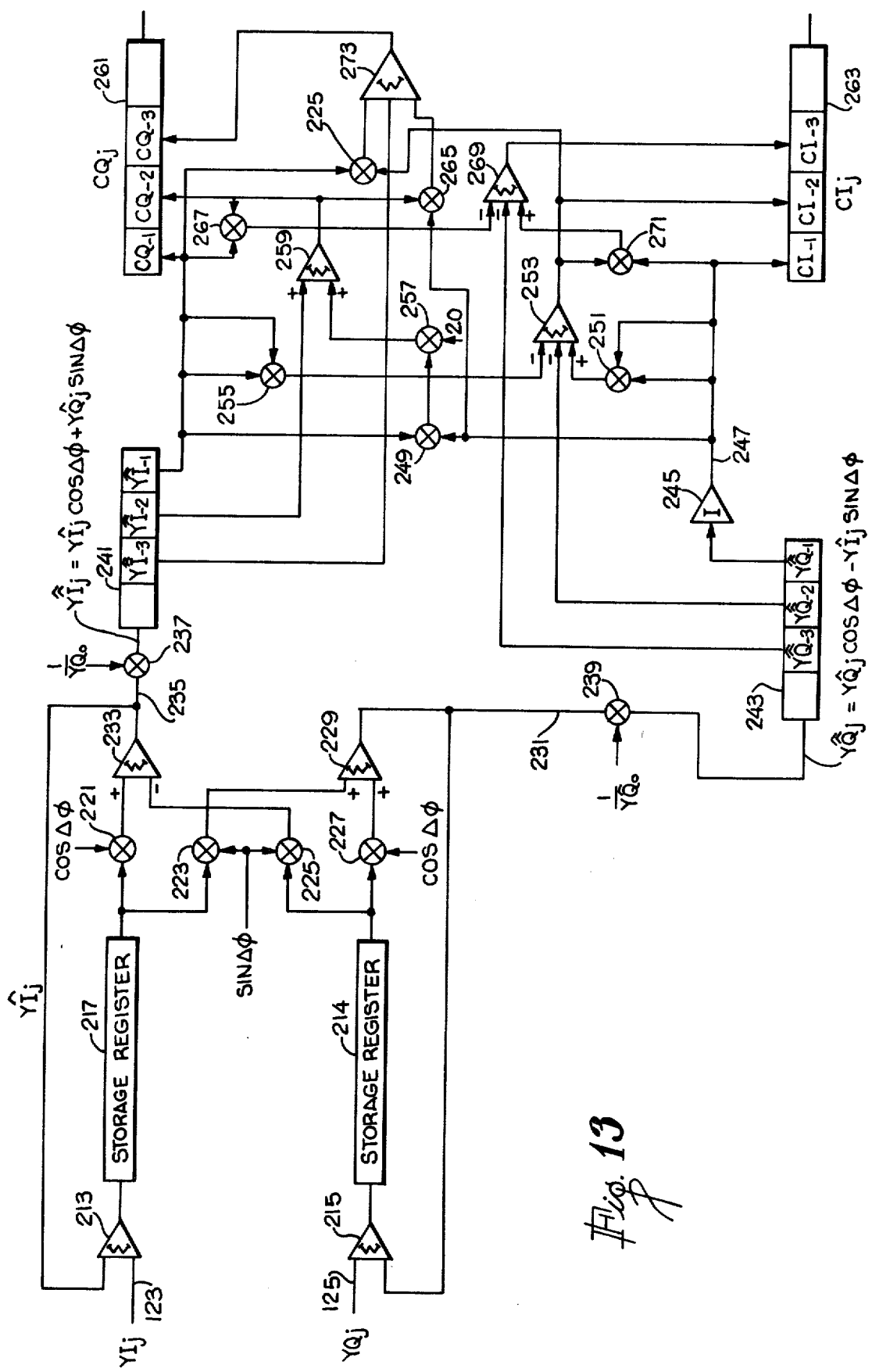
FIG. 13 illustrates an equalizer coefficient calculator for adjusting the equalization coefficients in accordance with a preferred method of the present invention.

The phase correction of the lead-in samples can be accomplished in an equalization coefficient calculator shown in block diagram form in the fast learn network 97 of FIG. 4 and in greater detail in FIG. 13. In the fast learn network 97, the conductors 123 and 125 can introduce the signals $Y_{-j}$ and $YQ_j$ into the calculator 211. More specifically, these sigals can be introduced into summation networks 213 and 215, respectively, as shown in FIG. 13. The signals from the networks 213 and 215 can then be loaded into storage registers 217 and 219, respectively. The $YI_j$ symbols from the register 217 can be sequentially introduced into a pair of multipliers 221 and 223. Similarly, the $YQ_j$ symbols can be introduced into a pair of multipliers 225 and 227.

A signal equivalent to sine $\Delta\phi$, which may be provided by a sine/cosine ROM, can also be introduced to the multipliers 223 and 225. In like manner, a signal equivalent to cosine $\Delta\phi$ can provide an additional factor to the multipliers 221 and 227. The products from the multipliers 223 and 227 can be added in an adder 229 to provide the signal $YQ_j$ of Equation 9 on a conductor 231. The products provided by the multipliers 221 and 225 can be combined in a differential adder 233 to provide the signal $YI_j$ of Equation 9 on a conductor 235. The signals on the conductors 231 and 235 can be fed back to provide an additional input to the respective summation networks 215 and 213.

Once the phase of both the lead-in and trailing samples have been corrected both the $YI_j$ and $YQ_j$ signals can be introduced to respective multipliers 237 and 239. In these multipliers 237 and 239, the signals are multiplied by a factor $1/YQ_0$ in accordance with Equation 10. The resulting products $YI_j$ and $YQ_j$ can be loaded into a pair of storage registers 241 and 243 respectively.

After the lead-in and trailing samples have been phase corrected and normalized in accordance with the block 118 of FIG. 6, the equalization coefficients can be calculated. At the input to the equalization network 79 (FIG. 3) the symbols $XI_j\, XQ_j$ can be represented by the following equation:

$$XI_j = DI_j\, hI_{-1} + DI_{j-1} + DQ_j\, hQ_{-1}$$

$$XQ_j = DQ_j\, hI_{-1} + DQ_{j-1} - DI\, hQ_{-1} \qquad \text{(Equations 11)}$$

where:

$DI_j$ and $DQ_j$ are the data symbols in the jth baud interval;

$DI_{j-1}$ and $DQ_{j-1}$ are the data symbols in the baud interval immediately preceding the jth baud; and $hI_{-1}$ and $hQ_{-1}$ represent the lead-in inphase and quadrature channel distortion, respectively.

In the equalization network 79, transversal equalizers (not shown) are provided with a plurality of taps which have variable coefficients $CI_j$ and $CQ_j$. These coefficients multiply the symbols $XI_j$ and $XQ_j$ in a manner discussed in significant detail in applicant's copending application for EQUALIZER, Ser. No. 405,290, previously discussed. In a preferred embodiment, the transverse equalizers in the equalization network 79 have ten taps and a corresponding number of equalization coefficients. For the purposes of discussion herein, it will be assumed that these transversal equalizers have only three taps $CI_{-1}$, $CI_{-2}$, and $CI_{-3}$ in the I channel and three taps $CQ_{-1}$, $CQ_{-2}$, and $CQ_{-3}$ in the Q channel. It will be further assumed that the center tap $CI_0$ in the I channel equals 1.0 and the center tap $CQ_0$ in the Q channel equals zero.

With these assumptions, the signals at the output of the equalization network 79 can be expressed as follows:

$$YI'_j = XI_j\, CI_{-3} + XI_{j-1}\, CI_{-2} + XI_{j-2}\, CI_{-1}\, XI_{j-3} - x_{0j}$$
$$CQ_{-3} - XQ_{j-1}\, CQ_{-2} - XQ_{j-2}\, CQ_{-1}$$

$$YQ'_j = XQ_j\, CI_{-3} + XQ_{j-1}\, CI_{-2} + XQ_{j-2}\, CI_{-1} + XQ_{j-3}$$
$$- x_{tj}\, CQ_{-3} + XI_{j-1}\, CQ_{-2} + XI_{j-2}\, CQ_{-1} \qquad \text{(Equations 12)}$$

In the manner discussed in the application Ser. No. 405,290 previously mentioned, Equations 11 can be substituted into Equations 12 and the coefficients for the intersymbol terms solve for a zero magnitude to minimize the effect of intersymbol interference. Following this procedure for the assumed number of taps, the coefficients $CI_j$ and $CQ_j$ can be set to the following calculated values to equalize the XI and XQ signals:

$$CI_{-1} = -hI_{-1}$$

$$CI_{-2} = (CI_{-1})^2 - (CQ_{-1})^2$$

$$CI_{-3} = (CI_{-1})(CI_{-2}) - (CQ_{-1})(CQ_{-2}) \qquad \text{(Equation 13)}$$

The above equations apply when the major intersymbol interference is provided by $hi_{-1}$ and $hq_{-1}$. A more general solution which considers all values of lead-in and quadrature channel distortion $hI_k$ and $hQ_k$, respectively, and any number of inphase and quadrature taps $CI_k$ and $CQ_k$ is given by the following general equation:

$$CI_k = -hI_k \quad k > 0.56$$

$$CI_0 = 1.0$$

$$CI_{-1} = -hI_{-1}$$

$$CI_{-2} = (CI_{-1})^2 - (CQ_{-1})^2 - hI_{-2}$$

$$CI_{-3} = CI_{-1}\, CI_{-2} - CQ_{-1}\, CQ_{-2} - hI_{-3}$$

$$CI_k = -hI_k \quad k < -3$$

where
$hI_k = YQ_k$ all $k$   0

$$CQ_k = hQ_k \quad k > 0$$

$$CQ_0 = 0$$

$$CQ_{-1} = hQ_{-1}$$

$$CQ_{-2} = 2CI_{-1}\, CQ_{-1} + hQ_{-2}$$

$$CQ_{-3} = CI_{-1}\, CQ_{-2} + CQ_{-1}\, CI_{-2} + hQ_{-3}$$

$$CQ_k = hQ_k \quad k < -3$$

where
$hQ_k = YI_k$ all $k$   0     (Equations 14)

These equations can be implemented by a portion of the equalization coefficient calculator 211 illustrated in FIG. 13. The phase corrected and normalized signal $YQ_{-1}$ can be introduced to an inverter 245 to provide the signal $1/YQ_{-1}$ on a conductor 247. This signal can be introduced to a multiplier 249 and squared in a multiplier 251 the output of which is connected to a positive input terminal of a summation network 253.

The phase corrected and normalized signal $YI_{-1}$ can also be introduced to the multiplier 249 and squared in a multiplier 255 the output of which is connected to a negative input terminal of the summation network 253. The product from the multiplier 249 can be multiplied by the quantity 2.0 in a multiplier 257, the output of which is connected to a positive input terminal of a summation network 259. The quantity $YI_{-2}$ from the register 241 can be introduced to a positive input terminal of the summation network 259. Similarly, the quantity $YQ_{-2}$ from the register 243 can be introduced to a negative terminal of the summation network 253.

The signal $YI_{-1}$ can be introduced directly from the register 241 into a register 261 to provide the equalization coefficients $CQ_{-1}$. The symbol $1/YQ_{-1}$ on the conductor 247 can be introduced to a register 263 to provide the equalization coefficient $CI_{-1}$. The output of the summation network 253 can be connected to the register 263 to provide the equalization coefficient $CI_{-2}$. Similarly, the output of summation network 259 can be connected to the register 261 to provide the equalization coefficient $C_{-2}$.

The output of the summation network 259 can also be introduced to a multiplier 265 and a multiplier 267. The symbol $YI_{-1}$ can provide an additional factor in the multiplier 267, and the resulting product introduced to a negative terminal of a summation network 269. This network 269 also receives the symbol $YQ_{-3}$ on a negative input terminal. The output of the summation network 253 and the conductor 247 can be connected to a multiplier 271 and the resulting product introduced on a positive input terminal to the summation network 269. The output of this network 269 can be connected to the register 263 to provide the equalization coefficient $Cl_{-3}$.

The signal on the conductor 247 can be introduced to the multiplier 265 and the resulting product introduced to a positive input terminal of a summation network 273. This network 273 also receives the symbol $YI_{-3}$ on a positive input terminal. The output of the network 253 can be combined with a symbol $YL_{-1}$ in a multiplier 275 to provide the resulting product on a positive input terminal of the summation network 273. The output of the network 273 can be connected to the register 261 to provide the equalization coefficient $CQ_{-3}$.

In the foregoing manner, the Equations 14 can be implemented to provide in the registers 261 and 263 coefficients which are introduced on respective conductors 277 and 279 to the equalization network 79. These coefficients can be combined with the signals XI and XQ as shown in Equations 12 to provide the equalized signals YI' and YQ'.

With the rapid adjustment of the converter 67, the equalization network 79, and the phase correction network 81, the receiver 29 is ready to receive data. It will be apparent that the fast learn network 97 and method of the present invention are particularly advantageous since they provide for the adaptation of the receiver 29 to the characteristics of the telephone line 23 in a minimal time, less than thirty milliseconds. This extremely short period of time is of particular advantage during the polling of a multipoint communication system since as many as twenty slave stations can be polled in a period of only one second, or less. This significantly increases the data throughput of the system.

Although the invention has been disclosed with reference to particular method steps and apparatus for accomplishing the method, it will be obvious to those skilled in the art that the method may include other steps and the apparatus may be otherwise embodied. For this reason, the scope of the invention should be ascertained only with reference to the following claims.

We claim:

1. An apparatus having first and second channels and adapted to make corrections for the phase error of a first signal comprising:
   phase correction means for making a correction in the phase of the first signal to provide a substantially phase corrected signal with the phase corrected signal having first and second components in the first and second channels, respectively;
   means for providing a phase error signal representative of the magnitude of the angle of phase error in the phase corrected signal, said angle having a trigonometric function which varies with the quotient of the first signal component divided by the second signal component;
   phase control means responsive to the phase error signal to adjust the phase correction means to tend to reduce the phase error of the phase corrected signal; and
   means responsive to said first signal component having a magnitude at least as great as a reference level for making a fixed predetermined adjustment in the phase correction means which reduces the phase error of the phase corrected signal.

2. An apparatus as defined in claim 1 wherein said trigonometric function is the tangent.

3. An apparatus as defined in claim 1 wherein said fixed predetermined adjustment is sufficient to correct for a predetermined number of degrees of said angle of phase error and the direction of said adjustment depends upon the sign of the product of said first and second components.

4. An apparatus for receiving an analog signal, said apparatus comprising:
   means for sampling the analog signal to provide a first signal having a digital format with any difference between the instant at which the analog signal is sampled and the instant at which such sample should have been taken being timing error;
   phase correction means for making a correction in the phase of the first signal to provide a substantially phase corrected signal with the magnitude of the phase corrected signal being variable from one baud to the next;
   means for providing a timing error signal representative of the timing error with said timing error signal being variable with the magnitude of an angle having a trigonometric function which varies with the quotient of the magnitude of the phase corrected signal in a first baud divided by the magnitude of the phase corrected signal in a second baud which is immediately adjacent the first baud; and
   timing control means responsive to the timing error signal to adjust the sampling means to reduce the timing error.

5. An apparatus as defined in claim 4 wherein said trigonometric function is the tangent and said second baud precedes the first baud.

6. An apparatus as defined in claim 4 wherein the timing error signal equals the difference between a first constant less the product of a second constant and said angle.

7. An apparatus as defined in claim 6 wherein said first and second constants are about 0.5 and about 1/90, respectively, said trigonometric function is the tangent and said second baud precedes the first baud.

8. An apparatus as defined in claim 6 wherein the magnitude of the phase corrected signal in the first baud is no greater than the magnitude of the phase corrected signal in the second baud.

9. An apparatus as defined in claim 4 wherein said timing error signal is a first timing error signal and is representative of the timing error at a first time and said apparatus includes means for providing a second timing error signal representative of the timing error at a second time and said second timing error signal being approximately equal to $$\frac{YQ_0}{YQ_{-1} + YQ_0}$$

where $YQ_0$ is the magnitude of the major sample and $YQ_{-1}$ is the magnitude of the sample taken immediately before the major sample, said timing control means being responsive to the second timing error signal to adjust the sampling means to reduce timing error.

10. An apparatus as defined in claim 4 wherein said timing error signal is a first timing error signal and is representative of the timing error at a first time and said apparatus includes means for providing a second timing error signal representative of the timing error at a second time with said second timing error signal being approximately equal to 0.67

$$\left(\frac{YQ_0}{YQ_{-1}}\right)$$

where $YQ_0$ is the magnitude of the major sample and $YQ_{-1}$ is the magnitude of the sample taken immediately before the major sample, and said timing control means being responsive to the second timing error signal to adjust the sampling means to reduce timing error.

11. An apparatus as defined in claim 4 wherein the apparatus has first and second channels and first and second components of the phase corrected signal are in the first and second channels, respectively, and said apparatus includes means responsive to said first signal component having a magnitude at least as great as a reference level for making a fixed predetermined adjustment in the phase correction means which reduces the phase error of the phase corrected signal.

12. A receiver adapted to receive an impulse, said receiver comprising:
means for sampling the impulse to provide a first signal having a digital format with any difference between the instant at which the impulse is sampled and the instant at which such sample should have been taken being timing error;
phase correction means for substantially correcting the phase of the first signal to provide a substantially phase corrected signal with the magnitude of the phase corrected signal being variable from one baud to the next;
means for providing a timing error signal representative of the timing error with said timing error signal being equal to $$\frac{YQ_0}{YQ_{-1} + YQ_0}$$

where $YQ_0$ represents the major sample of the impulse and $YQ_{-1}$ is the magnitude of the sample taken immediately before the major sample; and
timing control means responsive to the timing error signal to adjust the sampling means to reduce the timing error.

13. A receiver adapted to receive an impulse, said receiver comprising:
means for sampling the impulse to provide a first signal having a digital format with any difference between the instant at which the impulse is sampled and the instant at which such sample should have been taken being timing;
phase correction means for substantially correcting the phase of the first signal to provide a substantially phase corrected signal with the magnitude of the phase corrected signal being variable from one baud to the next;
means for providing a timing error signal representative of the timing error with said timing error signal being equal to −0.67

$$\left(\frac{YQ_0}{YQ_{-1}}\right)$$

where $YQ_0$ represents the major sample of the impulse and $YQ_{-1}$ is the magnitude of the sample taken immediately before the major sample; and
timing control means responsive to the timing error signal to adjust the sampling means to reduce the timing error.

14. An apparatus for receiving a signal and adapted to become at least partially synchronized with said signal in response to an impulse, said apparatus comprising:
means for sampling the impulse to provide a first signal having a digital format;
equalizer means for substantially equalizing the first signal, said equalizer means having a plurality of coefficients and means for multiplying the first signal by said coefficients; and
coefficient calculator means responsive to said first signal for providing at least a first of said coefficients with a magnitude which is a function of the distortion of the impulse and the magnitude of at least a second of said coefficients.

15. An apparatus as defined in claim 14 wherein said impulse has lead-in distortion and the first mentioned distortion is the lead-in distortion of the impulse.

16. An apparatus for receiving an analog signal and adapted to become at least partially synchronized with said signal in response to a preamble which includes a modulated tone followed by first and second impulses, said apparatus having first and second channels and comprising:
means for sampling the preamble to provide a first signal having a digital format with any difference between the instant at which the preamble is sampled and the instant at which such sample should have been taken being timing error, components of said first signal being in said channels, respectively;
equalizer means for substantially equalizing the first signal to provide a substantially equalized signal, said equalizer means having a plurality of coefficients and means for multiplying the first signal by said coefficients;
phase correction means for making a correction in the phase of the first signal to provide a substantially phase corrected signal with the phase corrected signal having first and second components in the first and second channels, respectively, said phase corrected signal being subject to phase error;
first means responsive to the modulated tone and the phase error of the phase corrected signal being greater than a predetermined amount of making a fixed predetermined adjustment in the phase correction means which reduces the phase error of the phase corrected signal;
second means responsive to the modulated tone and the magnitude of the phase error of the phase corrected signal for making a variable adjustment in the phase correction means which reduces the phase error of the phase corrected signal;
third means responsive to the first impulse for making a variable adjustment in the phase correction means which reduces the phase error of the phase corrected signal;
fourth means responsive to the tone and the first impulse for making first and second corrections, respectively, in the sampling means to reduce the timing error; and coefficient calculator means responsive to the second impulse for establishing the value of at least some of said coefficients.

17. An apparatus as defined in claim 16 wherein said fourth means includes means responsive to the modulated tone for providing a timing error signal representative of the timing error with said timing error signal being variable with the magnitude of an angle having a trigonometric function which varies with the quotient of the magnitude of the phase corrected signal in a first baud divided by the magnitude of the phase corrected signal in a second baud and timing control means responsive to the timing error signal to adjust the sampling means to reduct the timing error.

18. An apparatus as defined in claim 17 wherein the timing error signal equals the difference between about 0.5 and the product of 1/90 and said angle.

19. An apparatus as defined in claim 16 wherein said coefficient calculator means provides a first of said coefficients with a magnitude which is a function of the distortion of the second impulse and the magnitude of at least a second of said coefficients.

20. An apparatus as defined in claim 16 wherein said fourth means includes means responsive to the first impulse for providing a timing error signal representative of the timing error with said timing error signal being approximately equal to $$\frac{YQ_0}{YQ_{-1} + YQ_0}$$

where $VQ_0$ represents the major sample of the first impulse and $YQ_{-1}$ is the magnitude of the sample taken immediately before the major sample, said timing control means being responsive to the second timing error signal to adjust the sampling means to reduce timing error.

21. An apparatus as defined in claim 16 wherein said fourth means includes means responsive to the first impulse for providing a timing error signal representative of the timing error with said timing error signal being approximately equal to 0.67

$$\left(\frac{YQ_0}{YQ_{-1}}\right)$$

where $YQ_0$ represents the major sample of the first impulse and $YQ_{-1}$ is the magnitude of the sample taken immediately before the major sample, and said timing control means being responsive to the second timing error signal to adjust the sampling means to reduce timing error.

* * * * *

UNITED STATES PATENT OFFICE
CERTIFICATE OF CORRECTION

Patent No. 3,962,637     Dated June 8, 1976

Inventor(s) David M. Motley et al.

It is certified that error appears in the above-identified patent and that said Letters Patent are hereby corrected as shown below:

Column 14, Equation 6, should read $$\Delta T = -\frac{YQ_1}{|YQ_0| + |YQ_1|}$$

Claims 9, 12 and 20, the equations, each occurrence, should read $$\frac{YQ_0}{|YQ_{-1}| + |YQ_0|}$$

Signed and Sealed this

First Day of November 1977

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

Patent No. 3,962,637                Dated   June 8, 1976

Inventor(s)   David M. Motley and King Y. Cheng

It is certified that error appears in the above-identified patent and that said Letters Patent are hereby corrected as shown below:

Column 14, change Equation 6 to $\Delta T = - \dfrac{YQ_1}{|YQ_0| + |YQ_1|}$

Claim 4, line 12, change "hand" to -- baud -- .

Claim 5, line 2, change "second" to -- first -- .

Claim 5, line 3, change "first" to -- second -- .

Claim 7, line 4, change "first" to -- second -- and "second" to -- first -- .

Claims 9, 12 and 20, change the equation to $- \dfrac{YQ_1}{|YQ_0| + |YQ_1|}$

Claims 9, 12 and 20, two lines below the equation of each claim, change "$YQ_{-1}$" to -- $YQ_1$ -- and three lines below the equation in each claim, change "before" to -- after -- .

Claims 10, 13 and 21, change the equation to -- $YQ_1/YQ_0$ -- .

Claims 10, 13 and 21, two lines below the equation, change "$YQ_{-1}$" to -- $YQ_1$ -- and three lines below the equation, change "before" to -- after -- .

Claims 10 and 21, insert -- "-" -- before "0.67".

UNITED STATES PATENT OFFICE
CERTIFICATE OF CORRECTION

Patent No. 3,962,637      Dated June 8, 1976

Inventor(s) David M. Motley and King Y. Cheng

It is certified that error appears in the above-identified patent and that said Letters Patent are hereby corrected as shown below:

Continued

Claims 9 and 10, 1 and 2 lines below the equation and claims 12, 13, 20 and 21, 2 lines below the equation, change "magnitude" to -- value -- .

Claim 13, line 7, after "timing" insert -- error -- .

Claim 20, one line below the equation, change "$VQ_0$" to -- $YQ_0$ -- .

This certificate supersedes Certificate of Correction issued Nov. 1, 1977.

Signed and Sealed this

Tenth Day of January 1978

[SEAL]

Attest:

RUTH C. MASON
*Attesting Officer*

LUTRELLE F. PARKER
*Acting Commissioner of Patents and Trademarks*